Feb. 4, 1958 L. B. BICHER, JR 2,821,746
APPARATUS FOR EXTRUDING FILMS
Filed Jan. 25, 1954 3 Sheets-Sheet 1
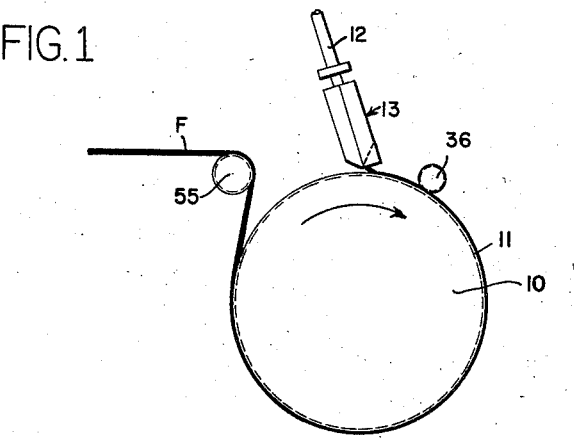
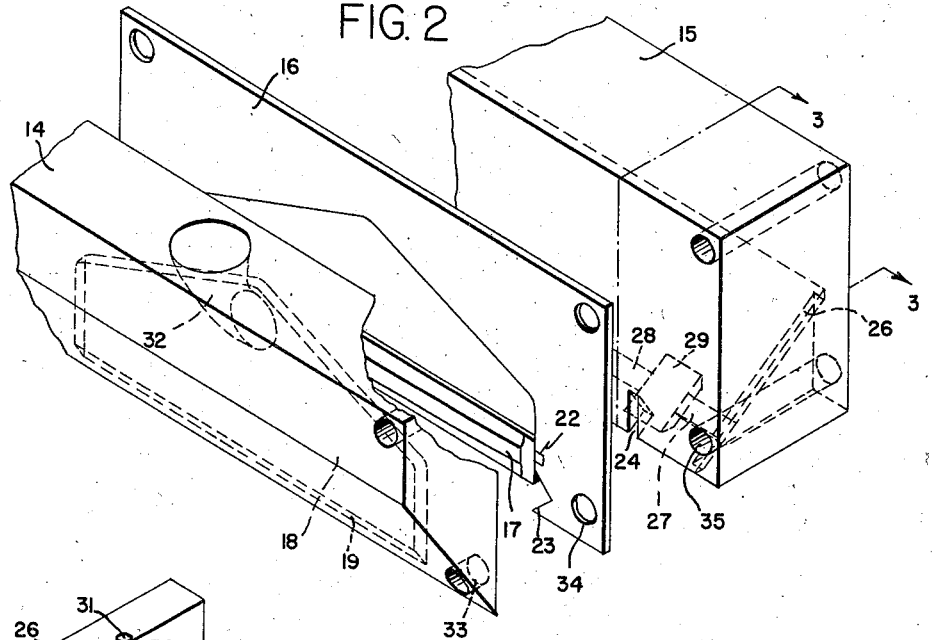
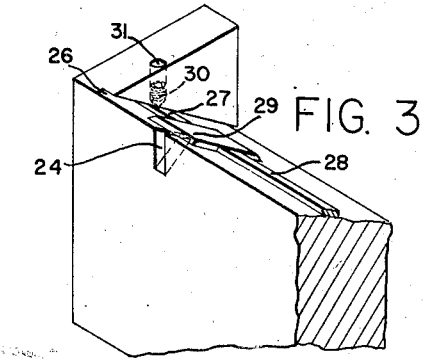
INVENTOR
LEO B. BICHER, JR.
BY Lynn Barrett Morris
ATTORNEY Feb. 4, 1958     L. B. BICHER, JR     2,821,746
APPARATUS FOR EXTRUDING FILMS
Filed Jan. 25, 1954     3 Sheets-Sheet 2

INVENTOR
LEO B. BICHER, JR.

BY *Lynn Barrett Morris*

ATTORNEY

INVENTOR
LEO B. BICHER, JR.

ATTORNEY

United States Patent Office 2,821,746
Patented Feb. 4, 1958

2,821,746
APPARATUS FOR EXTRUDING FILMS

Leo B. Bicher, Jr., Hackensack, N. J., assignor to E. I. du Pont de Nemours and Company, Wilmington, Del., a corporation of Delaware Application January 25, 1954, Serial No. 405,710

13 Claims. (Cl. 18—15)

This invention relates to the manufacture of continuous films having thickened edges and to an apparatus for extruding and forming such films. More particularly it relates to an apparatus for the manufacture of continuous films having thickened edges which films are composed of thermoplastic material capable of being biaxially oriented. Still more particularly it relates to such an apparatus comprising an extrusion die, a bead-forming drum and a bead-shaping roll. The invention also relates to a process of making the aforesaid films.

Various processes for forming continuous sheets or films of polymeric materials are known. They are divided into three main classes, one of which is a solvent casting method, the second a solvent extrusion method, and the third a dry extrusion or melt-casting method. The first two methods have the disadvantage that they require expensive solvent-recovery apparatus and are operated at relatively slow speeds. The melt-casting method eliminates the recovery of solvents but it is difficult to obtain uniform films of high quality. This is because of the fact that the films which are cast or extruded from a molten or liquefied state generally have a higher viscosity than in the solvent extrusion method. High viscosity materials retain imperfections and streakiness more readily than low viscosity materials.

It has been proposed to extrude molten polymeric material into sheets with thickened edges and to guide the edges by means of a pair of rows of guide rollers which are maintained in diverging paths. An apparatus suitable for this purpose is described in assignees Alles and Heilman, U. S. application Serial No. 303,908, filed August 12, 1952 now U. S. Patent 2,728,941. It has been found that while this process is commercially feasible, it is important that the beaded edges be of uniform cross-section and also that the thickness of the film between the edges be uniform.

An object of this invention is to provide an apparatus for the formation of continuous lengths of films with thickened edges of uniform dimensions. Another object is to provide such an apparatus which is simple in construction and easy to operate. A further object is to provide such an apparatus which gives uniform results over long periods of operation without requiring adjustment. A still further object is to provide such an apparatus which can be used with organic polymeric materials of relatively high molecular weights and melting or liquefying points or ranges. Still other objects will be apparent from the following description of the invention.

The above objects are accomplished in accordance with the present invention as will be apparent from the following description of the process and apparatus of the invention. The apparatus will now be described with reference to the accompanying drawings which constitute a part of this specification. In the drawings, like reference numerals denote like parts throughout the several figures. Referring now to the drawings:

Fig. 1 is a schematic sectional view of the various parts of the apparatus;

Fig. 2 is an expanded perspective view of the extrusion die;

Fig. 3 is an inverted perspective view of a section taken along the line 3—3 of Fig. 2;

Figure 7:
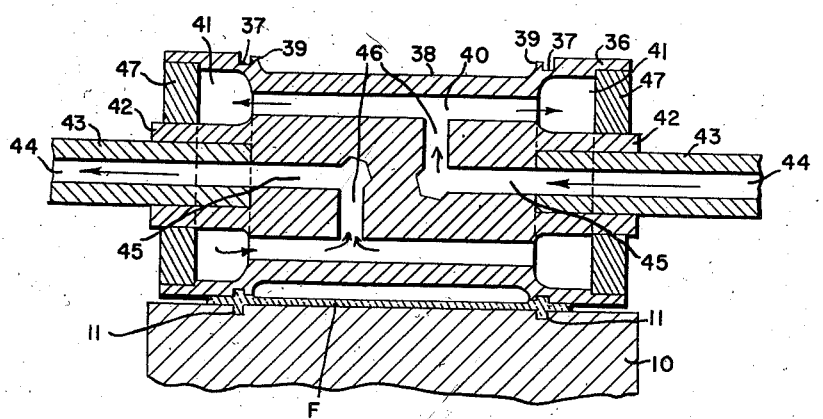
Fig. 7 is a lengthwise cross-sectional view of one type of bead-shaping roll.

Referring now to the drawings, a molten or liquefied organic polymeric material, e. g., polyethylene terephthalate is deposited onto the surface of a casting drum 10, which is revolved by any suitable driving mechanism from a suitable source of power (not shown) at a peripheral speed approximately equal to or greater than the speed of extrusion of the film from a die or extrusion orifice. The surface of the drum is provided with spaced channels or grooves 11 (as more clearly shown in Figs. 7 and 8 of the drawing) so that the polymeric material deposited on the surface of the drum flows into the grooves thereby forming a beaded projection on the lower surface of the resulting film F.

The polymeric material from a suitable source is passed through pipe or conduit 12 into an extrusion die 13. This die is composed of two blocks 14 and 15 and a spacer plate 16 which is provided with a removable orifice bar 17. The inner surface of block 14 contains an elongated narrow chamber 18. The lower wall 19 is tapered to aid in the flow of the polymer from the chamber. Spacer plate 16 has a similarly shaped chamber 20 but is provided near its lower end with a removable orifice bar 17, the ends of which contain projections or lugs 22 which fit into slots 21 on the spacer plate. One surface of the orifice bar is flat and fits against the inner surface of block 15. The other surface which extends into chamber 18 is tapered away from the vertical wall of such chamber and in an upward and downward direction, whereby it guides the flow of polymer from the chamber. This surface also is slightly tapered from its center point to its outer edges to provide for a uniform flow across the entire width of the orifice.

The inner surfaces of blocks 14 and 15 form, with spacer plate 16, a narrow rectangular orifice through which the extruded material flows. The width of the film before draw-down is determined by the distance d at the lower end of chamber 20 in the spacer plate. The inner walls 23 preferably are flared outwardly adjacent the opening to form knife-edges and the V-shaped areas adjacent these edges provide a larger flow of polymer at the edges so as to provide full beads in the cast film.

The inner surface of block 15 preferably is smooth and imperforate opposite the chambers 18 and 20 of block 14 and spacer plate 16 except for two spaced rectangular openings or channels 24. These channels preferably are spaced the same distance apart as the grooves 11 in the surface of drum 10. The bottom wall of blocks 14 and 15 are tapered upwardly, the tapered surface of block 15 forming a triangularly shaped recessed portion 25. The vertical walls at the ends of this triangular shaped segment are provided with channels 26 which serve to receive the ends 27 of a flow-controlling member 28. This flow-controlling member is adapted to slide upwardly and downwardly along the tapered surface of block 15 and contains elongated portions 29 which cover spaced openings 24. The outer lower surface of these portions preferably are tapered to form a knife-edge adjacent the openings. The distance the tapered edges is spaced above the lower inner edge of block 15 determines the height of the bead in the upper surface of the extruded film of polymeric material. A set screw 30 is provided in a threaded orifice 31 in the walls of block 15 adjacent channels 26 to lock flow controlling member 28 into its adjusted position.

Figure 4:
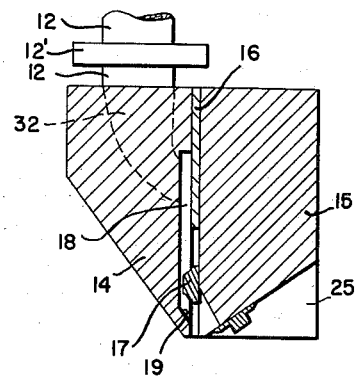
Fig. 4 is a cross-sectional view of the die in assembled position.
Figure 5:
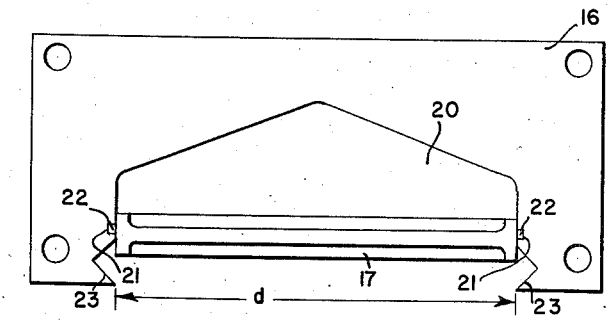
Fig. 5 is an elevation of the spacer plate and orifice bar.
Figure 6:
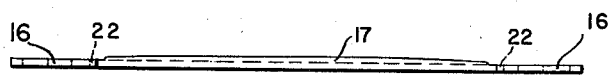
Fig. 6 is a plan view of the spacer plate and orifice bar.

Chamber 18 is connected near its upper central portion with a passage 32 which is connected to conduit 12 in any suitable manner. As shown in Figs. 1 and 4, two sections of conduit 12 are joined by a suitable coupling device 12'.

The blocks 14 and 15 and spacer plate 16 are provided with cooperating holes 33, 34 and 35, respectively, through which a suitable bolt is passed to hold the parts in tightly assembled condition. In Fig. 2 of the drawing, these cooperating holes are shown at the corners of the blocks but additional holes can be provided, if desired, along the upper edge and along the sides to insure firm, uniform contact of all parts.

Adjacent the drum 10 and a short distance from the point of extrusion of the film onto the drum, there is provided a bead-shaping roll 36, the surface of which is provided with two spaced circumferential grooves 37 which are spaced the same distance apart as the grooves 11 on the drum and also the same distance apart as the openings 24 in block 15 so that the respective beads and grooves or channels will be in juxtaposition. The bead-forming roll shown in Fig. 7 has a portion 38 between the circumferential grooves cut away so that it is of lesser diameter and will not contact with the surface of the film F throughout its major surface area. Small shoulder portions 39 near the grooves, however, are approximately the same in diameter or have a slightly less diameter than that cylindrical part of the roll which contacts with the surface of the extruded film F beyond the bead.

Bead-forming roll 36 is provided with an annular passage 40 which is disposed near its circumferential surface and used for the circulation of a heat-exchange liquid which will effectively cool the surface of the roll. This annular passage, moreover, connects at its outer ends with two annular chambers 41 which surround a cylindrical hub portion 42. Fitted into, or integral with these hub portions are hollow stub-shafts 43, the outer surfaces of which rotate in a suitable bearing (not shown) mounted on a suitable frame (not shown) to hold them in revolvable contact with the film on the drum. The hollow centers 44 of the stub-shafts connect with axial passages 45 in the central part of the roll, which, in turn connect wih two or a plurality of radial passages 46 to establish communication to and from annular passage 40. Surrounding the cylindrical hubs 42 are cylindrical end plates 47. These end plates may be welded, soldered, force-fitted, threaded or otherwise affixed to the hub and circumferential portions of roll 36. Similarly, the shaft portion may be so affixed to the hub portions of the roll.

Figure 8:
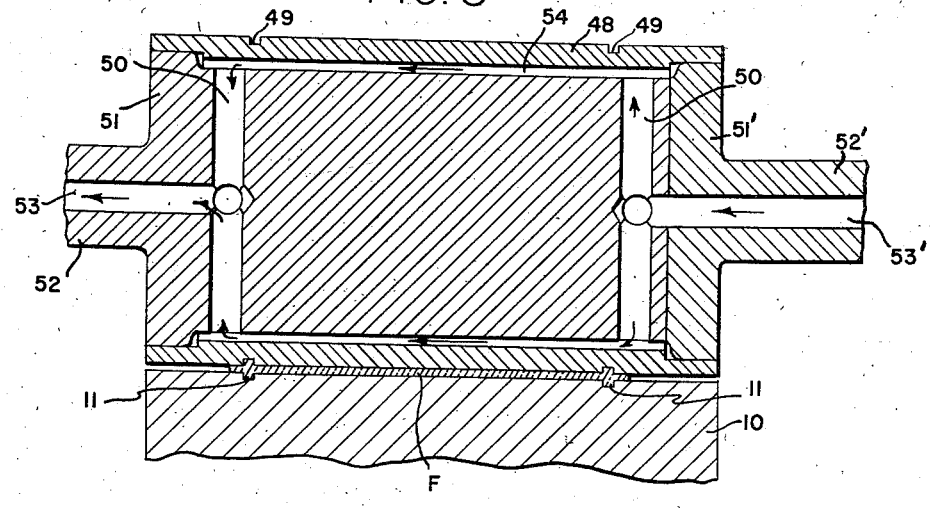
Fig. 8 is a lengthwise cross-sectional view of an alternative bead-shaping, calendering roll.

In Fig. 8 there is disclosed an alternative type of bead-forming, calendering roll. It consists of a hollow cylindrical body member 48 which has two spaced circumferential grooves 49 in its outer usrface that are spaced so as to fit over the beads formed in the extruded film F. A hub 51 having stub shaft portion 52 and an axial passage 53 fits into member 48. Its extended central portion is of smaller diameter and forms with the inner walls of member 48, an annular passage 54. A second hub 51' with stub shaft 52' and an axial passage 53' fits into the other end of the body and against the end of extended hub 51. The two hubs may be held together by a screw or dowel pins or other suitable means. However, by closely fitting the hubs to the body they remain in position. The outer bearing surfaces of stub shafts 52 and 52' are journalled in suitably mounted bearings (not shown). The axial ducts or openings 53 and 53' communicate with annular passage 54 through a plurality of radial passages 50, so that a heat-exchange fluid can be passed through one hub, circulated through the radial passages at one end then through the annular chamber through the radial passages at the other end and outwardly through the other hub.

The cylindrical hub members can be welded, soldered, force-fitted, threaded or otherwise affixed to the main body of the roll in the same manner as the parts of roller 36.

The outer surface of roll 48 is of uniform diameter except for the grooves 49 and serves to calender the film F as well as shape and provide a uniform contour to the bead on the extruded film.

The film is passed around drum 10 for a suitable distance so that it is firmly set, separated from the drum and passed over a guide roller 55 where it is led to a wind-up station or into other apparatus where it is stretched, and/or coated or given any other desired treatment. This guide roller may have a construction similar to the bead-forming rolls so that, if desired, a cooling fluid may be circulated through it.

The extrusion die described above is not limited to use in combination with a casting drum having spaced annular bead-forming grooves in its outer surface. To the contrary, half-beads (i. e., on one surface of the film) can be made by using a casting drum having a smooth outer surface. Moreover, half-beads can be formed in a film cast onto a drum having annular bead-forming grooves, by adjusting the groove-depth controlling member flush with the edge of the orifice lip so that the groove has depth zero.

The surfaces of the various parts of the extrusion die which contact with the molten or liquefied material to be extruded should be carefully machined and highly polished in order to obtain films having uniform dimensions and smooth surface characteristics. The surfaces of the drum and the bead-forming roll, including the bead-forming calendering roll, should likewise be carefully machined and highly polished for similar reasons.

The parts of the die should be made of metal and are preferably made of a corrosion-resistant steel which can be annealed and hardened and which will take a high polish. The parts contacting the molten or liquid or extruded film should, of course, have hard surfaces in order to preserve the highly polished surfaces during large scale continuous operations. Various types of die steels, stainless steel, including alloy steels, e. g., vanadium alloys, are commercially available and can be used to make the parts. They can be made of brass, bronze, titanium or a titanium alloy. The surface of the drum and the bead-forming roll likewise should be hard and capable of taking a high polish and can be made of similar materials.

With regard to the spacer plate, it can be made of steel, titanium, copper, aluminum or various types of alloys which do not have a deleterious effect upon the particular material to be extruded.

The thickness of the film extruded from the die is controlled by the thickness of the spacer plate. By substituting spacer plates of different thicknesses, one can obtain any desired film thickness. In addition, the orifice bar can be replaced by other orifice bars of different thicknesses and degrees of taper in order to control the flow of fluid to the orifice lips.

Various means can be used for adjusting the position of the groove-depth, flow-controlling member 28. Thus, in place of the set screws one may provide a vernier screw arrangement at each end of the slots with suitable connections joining the vernier screw and ends 27 of member 28.

The operation of the apparatus described above will now be explained with reference to the extrusion and bead-forming of a particular thermoplastic material, e. g., a non-oriented polyethylene terephthalate of the type described in Whinfield and Dickson, U. S. P. 2,465,319. This polymer in molten condition, is passed through the pipe or conduit 12 into the chamber of the extrusion die 13 where it flows under pressure past the orifice bar 17, thence through the lips formed by blocks 14 and 15 and through the bead-forming grooves 24 and onto the surface of drum 10. The extrusion die is placed in close proximity to the surface of the drum and the material preferably is extruded at a rate less than the circumferential rate of speed of the revolving drum so that there is some draw-down in the thickness of the extruded film. The extruded thermoplastic material still being in the fluid state, flows into the circumferential grooves on the drum to form beads on the lower surface of the extruded film. The extruded film, which is carried by the rotating drum, then passes under the bead-forming roll, which in the case of the type shown in Fig. 7, presses against the film and serves not only to give uniform shape to the upper bead but also serves to give a uniform shape to the lower bead. In the case of the bead-forming calendering roll shown in Fig. 8, the entire upper surface of the film is calendered during the shaping of the beads.

The extruded and shaped film cools as it passes around the drum which, if desired, can be provided with means for cooling it. The cast film is then removed from drum and passed over a suitable guiding roller 55 which can be provided with suitably spaced grooves in which the beads will fit during their passage over the roller. The film, if desired, can then be coated with a suitable substratum and passed into a suitable stretching apparatus where it can be biaxially oriented by stretching it simultaneously in two directions or by stretching it longitudinally or laterally in either order. Especially useful stretching apparatus is described in assignees Alles and Heilman U. S. Patent 2,728,941.

As an exemplary procedure a polyethylene terephthalate having a melting point above 200° C. can be made by carrying out the polymerization at a temperature of 215° C. to 285° C. and under a vacuum of 0.5 mm. in a suitable reaction vessel. The molten polymer is pumped at a temperature of 265° C. to 275° C. and pressure of 50 to 100 pounds per square inch to the extrusion die described above, wherein the orifice has a width of 4.5 inches, internal orifice thickness is 0.090 inch, the bead-groove opening at the lip is 0.063 inch, the width of the bead-grooves is 0.125 inch, the die lip is directly above the vertical axis of the drum and spaced 0.35 inch from the surface of the drum, the angle of the die axis from the vertical being 20 degrees, onto a casting drum having a diameter of 24 inches, a bead-groove depth of 0.036 inch and a bead-groove width of 0.125 inch, the drum being maintained at a temperature from 40 to 70° C. and having a peripheral speed of 50 to 300 inches per minute. The cast film is passed under a bead-forming calender roll having an outside diameter of 4.375 inches, a bead-groove depth of 0.036 inch and a bead-groove width of 0.125 inch, separated from the drum and passed over a grooved guide roller.

It will be apparent to those skilled in the art that the present processes and apparatus are not limited to the stretching of polyethylene terephthalate films but can be used in stretching thermoplastic films composed of many diverse materials. Among such materials which can be extruded and shaped are synthetic resins and superpolymers, e. g., nylon, polyethylene, polystyrene, polyvinyl halides, e. g., polyvinyl chloride, polyvinyl acetate, rubber hydrochloride; cellulose derivatives, e. g., cellulose acetate, cellulose formate, cellulose propionate, cellulose acetate butyrate; methyl, ethyl, butyl, benzyl, allyl and crotyl ethers of cellulose; polyesters from glycols and aliphatic dibasic acids, polyesteramides, etc. These films, moreover, may be coated with various thin layers including the vinylidene chloride copolymers described in Alles et al. U. S. Patent 2,491,023.

The extrusion die and pipes from the source of supply of molten or liquefied material to be extruded should be covered with an insulating material so that the material remains at a constant temperature during the extrusion operation. The pipes and die can also be provided with suitable jackets for the circulation of a heat-exchange fluid (e. g., a liquid or a vapor) so that the polymer can be maintained at the proper elevated temperature. Suitable heat-exchange fluids include steam, paraffin hydrocarbon, heat-transfer oils, ethylene glycol and chlorinated biphenyl, which can be used in either liquid or vapor form.

The heat-exchange fluids just described can be used for cooling the bead-forming rollers. However, it is not necessary to use such expensive fluids, since water gives satisfactory results.

With regard to the suitable dimensions for the above apparatus it has been found that a casting drum diameter of 24 inches gives adequate results but the diameter may vary from 12 to 60 or more inches. The bead-grooves may vary in depth from zero to 0.100 inch or more and in width from 0.080 to 0.250 inch. The bead-forming rolls may vary considerably in diameter, e. g., from 3 to 12 inches but are preferably from 4 to 5 inches in diameter and the bead-groove depths and widths of the same size as those in the drum.

With materials such as polyethylene terephthalates, the lips of the extrusion die can be maintained at a distance of about 0.2 to 0.5 inch above the surface of the casting drum. With the particular die described above, it is preferable to have the axis of the lips of the die at an angle, from the radius of the drum, of 10 to 30 degrees.

An advantage of this invention is that it provides a simple yet effective apparatus for producing a film of uniform thickness with uniform beaded edges. Another advantage resides in the fact that the apparatus gives uniform results over long periods of time without adjustment. A further advantage is that the equipment is relatively small in size and does not require an expensive frame to maintain it in operative relation. A still further advantage resides in the fact that the character of the extruded film can be closely observed during the extrusion operation. The apparatus is simple and relatively inexpensive to make and assemble. Different thicknesses of films can be obtained readily by disassembling the die and inserting a different spacer plate and/or orifice bar. Still other advantages of the apparatus will be apparent from the above.

The embodiments of the invention in which an exclusive property or privilege is claimed are defined as follows:

1. An apparatus comprising an extrusion die having a narrow rectangular slot orifice, one lengthwise lip thereof defining such orifice being straight and the other being straight except for two spaced bead-forming slots of small cross-section, a revoluble casing drum beneath said die and adjacent said drum a bead-shaping roll having circumferential spaced bead-shaping grooves, said roll being adapted to press against a film extruded through said orifice and carried by said drum.

2. An apparatus comprising an extrusion die having a narrow rectangular slot orifice, one lengthwise lip thereof defining such orifice being straight and the other being straight except for two spaced bead-forming slots of small cross-section, a revoluble casting drum beneath said die having circumferential spaced bead-forming grooves of small cross-section, and adjacent said drum a bead-shaping roll having circumferential spaced bead-shaping grooves, said roll being adapted to press against a film extruded through said orifice and carried by said drum.

3. An apparatus comprising an extrusion die having a narrow rectangular slot orifice, one lenthwise lip thereof defining such orifice being straight and the other being straight except for two spaced bead-forming slots of small cross-section located near the ends of the said slot orifice, a revoluble casting drum a short distance beneath said die, said drum having circumferential, similarly spaced bead-forming grooves, and adjacent the drum a revoluble bead-shaping roll having circumferential grooves similarly spaced and of similar cross-section, said roll being adapted to press against the beaded surface of a film extruded through said orifice and carried by the said drum.

4. An apparatus as set forth in claim 3 wherein the said roll is provided with means for regulating its temperature.

5. An apparatus comprising an extrusion die having a narrow rectangular slot orifice, one lengthwise lip thereof defining such orifice being straight and the other being straight except for two spaced bead-forming slots of small cross-section located near the ends of said slot orifice, means for regulating the depth of said slots, a revoluble casting drum a short distance beneath said die, said drum having circumferential, similarly spaced bead-forming grooves, and adjacent said drum a revoluble bead-shaping roll having circumferential grooves similarly spaced and of similar cross-section, said roll being adapted to press against the beaded surface of a film extruded through said orifice and carried by the said drum, and a guiding roller for directing the extruded and shaped film from the drum.

6. An apparatus comprising an extrusion die having a narrow rectangular slot orifice, one lengthwise lip thereof defining such orifice being straight and the other being straight except for two spaced bead-forming slots of small cross-section located near the ends of said slot orifice, a revoluble casting drum a short distance beneath said die, said drum having circumferential similarly spaced bead-forming grooves, a revoluble bead-shaping roll having circumferential grooves similarly spaced and of similar cross-section, said roll being adjacent said drum and adapted to press against the beaded surface of an extruded film carried by the said drum, and a guiding roller for directing the extruded and shaped film from the drum.

7. An extrusion die comprising two blocks having outer slanting lower portions the inner surfaces forming extrusion orifice lips, one of said blocks having an inner chamber for a liquid to be extruded, a spacer plate having a similar chamber and bearing an orifice bar near its outlet end the said plate defining with the aforesaid inner surfaces an elongated slot orifice, the other block having an inner surface which is smooth except for two bead-forming spaced grooves of small cross-section terminating near the ends of the said orifice in slots of similar cross-section, means for holding said blocks and spacer plate is assembled relation and a passage in said first block communicating with said chamber for the introduction of a liquid into the chamber.

8. An apparatus comprising an extrusion die comprising two blocks having outer slanting lower portions the inner surfaces forming extrusion orifice lips, one of said blocks having an inner chamber for a liquid to be extruded, a spacer plate having a similar chamber and bearing an orifice bar near its outlet end the said plate defining with the aforesaid inner surfaces an elongated slot orifice, the other block having an inner surface which is smooth except for two bead-forming spaced grooves of small cross-section terminating near the ends of the said orifice in slots of similar cross-section, means for holding said blocks and spacer plate in assembled relation and a passage in said first block communicating with said chamber for the introduction of a liquid into the chamber, a revoluble casting drum beneath said die and adjacent said drum a bead-shaping roll having circumferential spaced bead-shaping groups, said roll being adapted to press against a film extruded through said orifice and carried by said drum.

9. An apparatus as set forth in claim 8 wherein said bead-shaping roll has axial ducts communicating with a passage near the circumference of the roll for the circulation of a heat-exchange fluid.

10. An extrusion die comprising two spaced blocks having outer slanting lower portions and straight inner surfaces at their bottom edges defining extrusion orifice lips, one of said blocks having an inner chamber for a liquid to be extruded, a thin spacer plate having a similar chamber, the end walls of said plate being flared to define knife edges and defining with the aforesaid surfaces an elongated slot orifice, a removable orifice bar near the outlet end of the spacer plate and located a short distance above said lips, said orifice bar being flat on one surface and being tapered upwardly and downwardly and sidewardly from its center on the other surface, said bar being located in the lower part of the chamber in said block to control the flow of liquid from the chamber to the orifice lips, the other block having an inner surface which is smooth except for two spaced bead-forming grooves of small cross-section terminating near the ends of said orifice in slots of similar cross-section, means for adjusting the depth of said slots, means for holding the blocks and spacer plate and orifice bar in assembled relation, and a passage in said first block communicating with said chamber and a source of supply of liquid to be extruded.

11. The process which comprises extruding a film of thermoplastic polymer, in the form of a sheet having one smooth surface and having two spaced beads of small cross-section on the other surface, onto a casting drum and shaping said beads by rotating, in contact with said extruded film, a bead-shaping roll having similarly shaped grooves, said latter grooves contacting the beads on the outer surface of the film.

12. The process which comprises extruding a film of thermoplastic polymer, in the form of a sheet having one smooth surface and having two spaced beads of small cross-section on the other surface, onto a casting drum having similarly spaced bead-forming grooves to form beads on the smooth surface of the extruded film and shaping said beads by rotating, in contact with said extruded film, a bead-shaping roll having similarly shaped grooves, said latter grooves contacting the beads on the other surface of the film.

13. The process which comprises extruding a film of thermoplastic polymer, in the form of a sheet having one smooth surface and having two spaced beads of small cross-section on the other surface, onto a casting drum having similarly spaced bead-forming grooves to form beads on the smooth surface of the extruded film, and simultaneously shaping the beads on the other surface of the film and calendering the other surface of the film between said beads by rotating, in contact with said extruded film, a bead-shaping calendering roll having similarly shaped grooves.

References Cited in the file of this patent

UNITED STATES PATENTS

| | | |
|---|---|---|
| 2,175,961 | Kampfer | Oct. 10, 1939 |
| 2,212,770 | Foster | Aug. 27, 1940 |
| 2,249,311 | Johnson et al. | July 15, 1941 |
| 2,439,939 | Lesavoy | Apr. 20, 1948 |
| 2,628,386 | Thornberg | Feb. 17, 1953 |
| 2,736,066 | Chren et al. | Feb. 28, 1956 |